(12) United States Patent
Chandler, Jr.

(10) Patent No.: US 6,595,051 B1
(45) Date of Patent: Jul. 22, 2003

(54) FLUID LEVEL SENSING AND CONTROL SYSTEM

(75) Inventor: William D. Chandler, Jr., Ashland, OH (US)

(73) Assignee: Chandler Systems, Inc.

( * ) Notice: Subject to any disclaimer, the term of this patent is extended or adjusted under 35 U.S.C. 154(b) by 0 days.

(21) Appl. No.: 09/939,468

(22) Filed: Aug. 24, 2001

Related U.S. Application Data

(63) Continuation-in-part of application No. 09/590,415, filed on Jun. 8, 2000.

(51) Int. Cl.$^7$ .................. G01F 23/14; B67D 5/08; H01H 35/34
(52) U.S. Cl. .............. 73/301; 73/299; 73/313; 73/723; 73/745; 200/61.21; 200/83 J; 200/83 F; 200/83 H; 200/190
(58) Field of Search ............ 73/714, 715, 723, 73/744, 745, 290 R, 299, 301; 200/83 J, 83 F, 83 N, 190

(56) References Cited

U.S. PATENT DOCUMENTS

| | | | | |
|---|---|---|---|---|
| 3,283,092 A | * | 11/1966 | Grostick | 200/61.2 |
| 3,773,991 A | * | 11/1973 | Krieger et al. | 200/83 P |
| 4,270,568 A | * | 6/1981 | Gray | 137/498 |
| 4,554,830 A | * | 11/1985 | Khoi | 73/299 |
| 4,631,374 A | * | 12/1986 | Zoludow | 200/61.21 |
| 4,648,277 A | * | 3/1987 | Obermann | 73/725 |
| 4,771,804 A | * | 9/1988 | Morales | 137/412 |
| 4,797,007 A | * | 1/1989 | Elmore, III | 374/143 |
| 4,827,095 A | * | 5/1989 | Clark et al. | 200/83 J |
| 4,914,264 A | * | 4/1990 | Everett | 200/83 S |
| 5,105,662 A | * | 4/1992 | Marsh et al. | 73/299 |
| 5,814,779 A | * | 9/1998 | Verras et al. | 200/83 P |

* cited by examiner

Primary Examiner—Hezron Williams
Assistant Examiner—Katina Wilson
(74) Attorney, Agent, or Firm—Christopher L. Parmelee; Ralph E. Jocke; Walker & Jocke LPA

(57) ABSTRACT

An improved pressure activated control apparatus is provided for sensing fluid pressure and triggering one or more switches in response to the fluid pressure, as desired. The apparatus is designed to be placed within a fluid of a reservoir. The apparatus includes a first resilient member, such as a pliable rolling diaphragm or bellofram, having an outer surface exposed to the fluid and responsive to the fluid pressure. The pressure activated control apparatus includes a second resilient member, such as a spring with a chosen spring constant, k, that provides a biasing force against the diaphragm that is opposite the fluid pressure. A transducer is operative to monitor changes in pressure of gases within the apparatus causes by movement of the diaphragm. A controller is responsive to the transducer and selectable fluid level thresholds to activate pumps and/or valves for adjusting the level of the fluid in the reservoir.

28 Claims, 12 Drawing Sheets

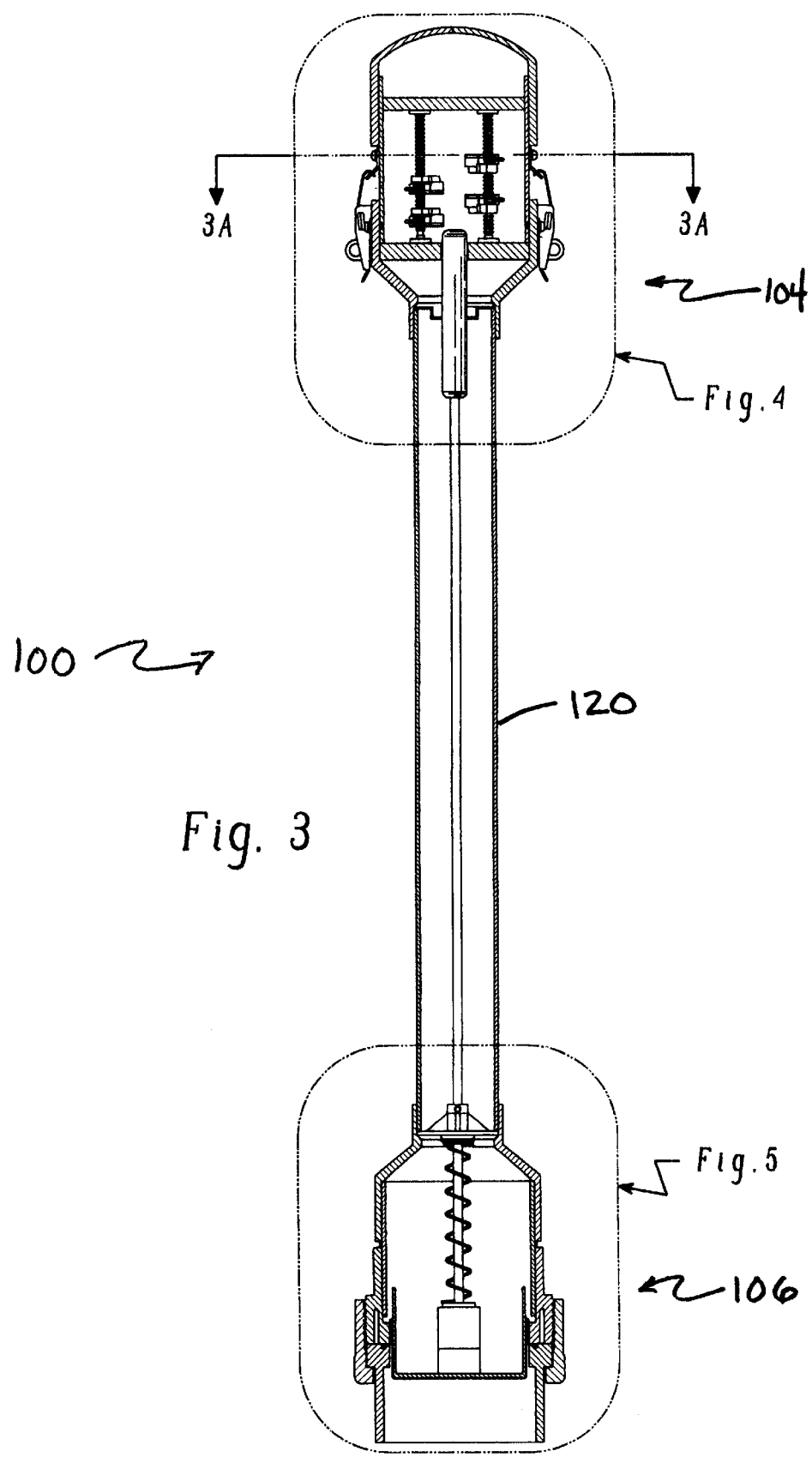

FLUID LEVEL SENSING AND CONTROL SYSTEM

CROSS REFERENCE TO RELATED APPLICATIONS

This application is a continuation-in-part of U.S. application Ser. No. 09/590,415 filed on Jun. 8, 2000.

TECHNICAL FIELD

The present invention relates to pressure-responsive systems and components. Specifically this invention relates to devices and systems that sense the level or depth of fluids and responds thereto by triggering switching mechanisms.

BACKGROUND ART

It is often desirable to know information about fluid levels in tanks. Determining fluid levels and controlling fluid levels in tanks, such as in sewage tanks, water cisterns or tanks, and other fluid system and storage vessels, whether enclosed or open and exposed to the environment, has been done in a number of ways. For example, in tanks that are visually accessible, an operator may periodically take visual readings of the fluid level.

Visual readings, however, are often not desirable, in systems where an automatic response is required when the fluid level reaches a certain threshold. In such cases the activation of a pump or valve may be necessary to move more fluid into the vessel or to discharge fluid from the vessel. In systems where visual readings are not available or when an immediate response is required, control systems are typically employed that are responsive to a fluid level indication. Such control systems may illuminate a light on an indicator panel representing the fluid level and/or trip an alarm to notify a human operator that corrective action is required.

Unfortunately having a human operator manually initiate a corrective function may not be desirable due to the repetitive nature of the function or due to the inefficiency of having a human operator in the system. As a result, control and indicator functions are typically handled by electronic control systems which are responsive to one or more switches that are triggered by fluid level or pressure input. For example, in sewage tanks it is well known to use multiple tilt style float switches to control the fluid level. These may be mercury switches or rolling ball switches, where a ball triggers a microswitch within the mechanism. These switches are triggered when the whole switch mechanism tilts downward toward a tethered connection a sufficient amount. Tilt style float switches are typically attached via an anchor tether either directly to the vessel interior wall, or to a bar, rail, or other vertically disposed structural member within the vessel. A plurality of these tilt style float switches are often disposed vertically with each one representing a unique elevation of fluid level within the vessel.

Unfortunately, numerous problems have been encountered with these mechanisms. For example, turbulent conditions within a fluid-holding vessel can negatively impact performance of float switch systems. Such turbulence is often the result of fluidized material inflow and/or pump-discharged fluid material exiting the tank. This turbulence can create undesirable eddies and waves within the tank that can cause tethered tilt style float switches to become entangled, thus preventing them and the system from proper operation. In addition, the turbulence within the tank can cause inadvertent switching and what is often referred to as "contact chatter" of the switches within the tilt style float switch assemblies. Inadvertent switching can cause system inefficiency and degradation, such as a false level reading which causes a pump to turn on or off earlier or later than desired. Such contact chatter can cause the pump, which is responsive to the triggered switch, to cycle inadvertently on and off at a high rate, resulting in undue and undesirable system wear and operation. Consequently there exists a need for a fluid level sensing and control system which is more reliable in turbulent environments.

Other problems that can result from tilt style float switches include the fact that they are disposed adjacent the surface of the fluid material in the sewage tank. Such environments are often highly corrosive and greasy. These tethered switches can become damaged from banging against each other and the tank wall during the turbulent system operation. In addition, the greasy outer surface of the tilt style float switches can cause them to intermittently adhere and even get stuck against the tank wall, thus affecting system performance and reliability. In addition, low pressure sewage system tanks in both residential and commercial use are often of corrugated side wall construction. These corrugations can serve as a series of mini-ledges or shelves to the grease-covered tilt style float switches, thus facilitating their adherence and entrapment. The tilt style float switches can also become corroded. Leaking mercury from some styles of these switches poses a serious environmental and health hazard. Non-mercury versions of the tilt style float switches can similarly be ruined by corrosion of their contact or leads, thus rendering them inoperable. Consequently there exists a need for a fluid level sensing and control system which is more reliable in corrosive, greasy, and/or contaminated environments.

Another type of known switching mechanism performs similarly to the typical toilet, in which a ball floats with the fluid level and closes the valve when the tank is full after the toilet is flushed. In these switching mechanisms, the ball floats on the liquid and bumps switches on and off. As with tilt style float switch assemblies, ball float switching mechanisms can only represent the actual liquid level when the switch is bumped and triggered. Consequently there exists a need for a fluid level sensing and control system which can indicate a range of fluid levels. There also exists a need for a fluid level sensing and control system which can be easily adjusted to change the range of fluid levels being monitored.

Another common problem with all of the aforementioned tilt style float switches, and vertical ball float switches is in servicing these systems. Since they are disposed in sewage tanks or other fluid vessels, servicing them can be a messy, less than ideal, undertaking. Consequently there further exists a need for a fluid level sensing and control system which is easier to service.

DISCLOSURE OF INVENTION

It is an object of the exemplary form of the present invention to provide a fluid level sensing and control system.

It is a further object of the exemplary form of the present invention to provide a fluid level sensing and control system which accurately and reliably indicates fluid levels within a reservoir.

It is a further object of the exemplary form of the present invention to provide a fluid level sensing and control system which accurately and reliably indicates fluid levels within reservoirs with turbulent environments.

It is a further object of the exemplary form of the present invention to provide a fluid level sensing and control system which is operative to reliably indicate fluid levels for reservoirs with corrosive, greasy, and/or contaminated environments.

It is a further object of the exemplary form of the present invention to provide a fluid level sensing and control system which is operative to control the input and/or output of fluids within a reservoir responsive to the fluid level in the reservoir.

It is a further object of the exemplary form of the present invention to provide a fluid level sensing and control system which is easy to configure and service.

It is a further object of the exemplary form of the present invention to provide a fluid level sensing and control system which does not require electrical components disposed within the fluid of the tank.

Further objects of exemplary forms of the present invention will be made apparent in the following Best Modes for Carrying Out Invention and the appended claims.

The foregoing objects are accomplished in an exemplary embodiment of the invention by a pressure activated control apparatus that includes a first resilient member having a first or outer surface exposed to the fluid and is responsive to the fluid pressure to trigger one or more switches of a force translation and switching mechanism. The pressure activated control apparatus includes a second or inner surface exposed to the inside of the apparatus that is sealed from the fluid. The force translation and switching mechanism responds to changes in the force exerted by the pressure of the fluid on the outer surface of the first resilient member to trigger one or more switches. The pressure activated control includes a second resilient member that provides a biasing force against the force translation and switching mechanism in a direction opposite to the force exerted by the fluid pressure on the outer surface of the first resilient member. In this way, change in height of the fluid level within the vessel compared to movement of the force translation and switching mechanism is greater than one-to-one.

The apparatus of the exemplary form of the present invention provides a reliable, affordable alternative to known tilt style float switches, vertical float switching assemblies and electronic pressure transducer-based systems used for, among other possibilities, determining fluid level or controlling fluid level in open or enclosed fluid holding vessels, such as fluid storage or septic tanks, cisterns, sump and sewage basins, and other fluid system and storage vessels. In one embodiment, the pressure activated control of the present invention is provided in an elongate, vertically disposed housing that can be connected to an interior side wall of a tank, cistern or other fluid-holding vessel, such that the first resilient member has an outer surface that is substantially always in contact with the fluid. The first resilient member can be a pliable rolling diaphragm made of durable nitrite rubber, or any other suitable material selected based on the environment it is to be exposed to, including chemical and thermal environments. In one exemplary embodiment, the rolling diaphragm is in the shape of a bellofram, or a cup with a radially outwardly extending peripheral flange at its upper open end (i.e., it is top hat-shaped), that is sealed at its flange to the housing near a first or lower housing end. The rolling diaphragm acts together with a push cup, a rod and a plunger that are centrally disposed in the elongate housing to serve as a substantially zero friction piston to actuate or trip one or more switches, such as a plurality of microswitches.

In one exemplary embodiment, the second resilient member may be a spring of a selected spring constant, "k," that is disposed within the housing between the push cup and an annularly disposed spring plate which is connected to the housing. The spring can be annularly disposed around the rod and provides a biasing force against the push cup and rolling diaphragm, such that for every linear distance of movement of the piston assembly, which includes the rolling diaphragm, push cup, rod and plunger, vertically upward within the housing, a multiple greater than one times that lineal distance of incremental fluid level is being represented by that piston assembly movement. Simply changing the spring to one with a different spring constant k, allows for a different fluid level range to be sensed or controlled with the same pressure control apparatus. For example, one spring can give approximately eighteen inches of fluid level representation or control with about four inches of corresponding piston assembly travel, whereas a second spring can give forty-two inches of fluid level representation or control. Consequently, substituting a different spring (different k constant) will give a correspondingly different range of fluid level control.

In one exemplary embodiment of the present invention, a plurality of microswitches are housed in a head portion of the housing, at a second or upper housing end. The microswitches are each adjustably and removably connected on a switch track assembly such that each one is tripped at a different plunger vertical elevation within the housing, thereby allowing for adjustable fluid level control within the vessel.

In one exemplary embodiment, the switch track assembly comprises a top piece and a bottom piece connected by four identical spaced switch mounting rails, or switch track rods. The microswitches are each connected to a switch coupler piece that snaps onto an adjacent pair of the rods, such that the switch trigger can be contacted by the plunger coming through a hole in the bottom piece of the switch track assembly in response to sensed fluid pressure on the overall piston assembly. Each switch coupler and corresponding microswitch pair can easily be snapped along the switch track rails making for an adjustable fluid level control system. In an alternative embodiment, the switch track assembly can accommodate up to fourteen such commercially available microswitches each mounted on a removable switch coupler to two adjacent switch track rods.

Although one surface of the rolling diaphragm is meant to be continuously exposed to fluid material in the tank at a subsurface fluid level, the remaining interior of the housing is sealed from the fluid and can be connected to a source of fresh air, such as by a vent tube or line connected at some upper apparatus location to outside air external to the fluid vessel. In this way, the switches are not exposed to corrosive liquids or gases within the vessel and the volume of air displaced by the rolling diaphragm and piston assembly in response to a fluid elevation increase in the vessel can be vented. Correspondingly, the vent line serves as a source of fresh air brought into the apparatus when the fluid elevation within the vessel is decreased, such as by a pump discharge cycle, and the rolling diaphragm unrolls or relaxes with the piston assembly moving downward.

In exemplary embodiments of the present invention, the housing may be made substantially from a combination of commercially available, off-the-shelf standard sized PVC piping, couplers, reducers, aluminum bar stack, and the like, and from a minimum number of specially fabricated components (such as of molded ABS, Lexan® (General Electric Company) or other suitable plastic, or fabricated from another suitable material), thereby minimizing system cost. In one exemplary embodiment, four microswitches can be provided representing, from lowest to highest elevation along a switch track assembly: off, pump on one, pump on two, and an alarm, respectively. Such an arrangement is common in preexisting sewage tank systems, thereby making for easy retrofit of tilt style float switch sewage tank systems with the present invention. The present invention can simply replace the tilt style float switches and be wired to the existing control system. Servicing the system and adjusting the switches and corresponding fluid control levels can be done simply and in the field, without any tools. In another exemplary embodiment for sensing fluid level and indicating the same, fourteen microswitches can be provided. Such a system could be employed to represent a series of fluid elevations on an indicator panel and have an alarm level, e.g. Of course in other exemplary embodiments longer piston assemblies and switch track assemblies could be substituted allowing for more microswitches and more range of fluid level representation and control.

The pressure activated control apparatus and system of exemplary forms of the present invention provide a reliable, affordable and easily serviceable means to trigger a switching apparatus in response to fluid pressure or level. No electric cords or components are submerged in the fluid. The fluid level can be adjustably controlled by the apparatus. The apparatus operates within its own enclosure envelope and senses fluid pressure at a subsurface fluid level, such that it is not susceptible to turbulent surface conditions or the greasy surface layer typically found in sewage tanks that is known to affect system performance and reliability.

Still further advantages of the present invention will become apparent to those of ordinary skill in the art upon reading and understanding the following detailed description of the preferred embodiments. For example alternative exemplary embodiments of the present invention may include a control device that is responsive to pressure changes of gases caused by the displacement of a diaphragm of an exemplary embodiment of a pressure responsive device. Such a control device may include manually adjustable switches for selecting a desired depth range for the liquid in a reservoir. Current depth levels may be visually displayed by the described exemplary embodiment of the control device in terms of a percentage of the selected depth range for the liquid. In addition, switches, pumps, valves and alarms may be triggered when the determined depth level of the liquid breaches one or more selectable thresholds. Such thresholds may be represented by the controller as a percentage of the selected depth range for the liquid.

BRIEF DESCRIPTION OF DRAWINGS

FIG. 3 is a partial sectional side view of an exemplary embodiment of the present invention.

BEST MODES FOR CARRYING OUT INVENTION

Figure 1:
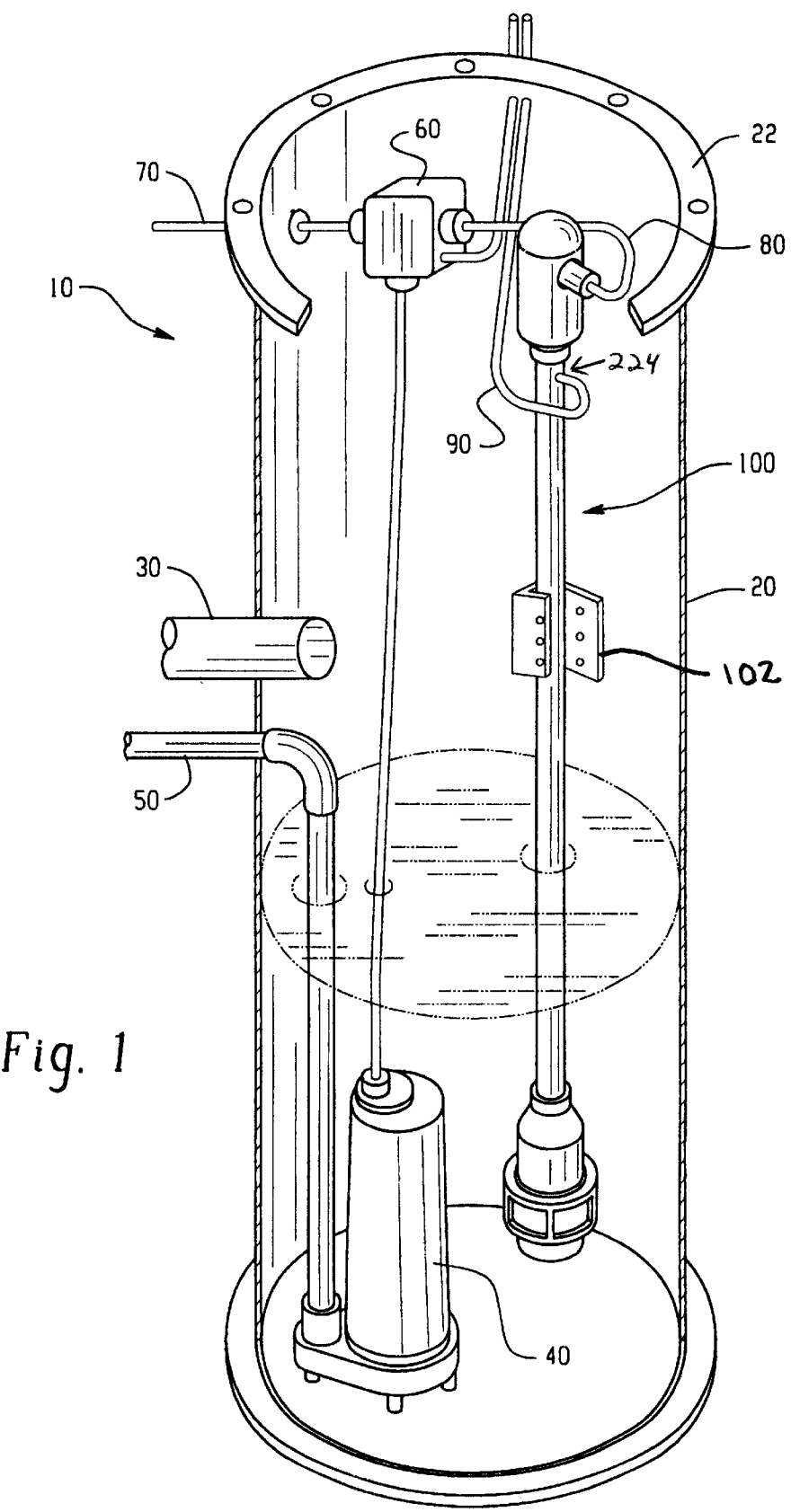
FIG. 1 is a partial sectional view of an exemplary embodiment of the present invention for sensing and controlling fluid level within a system, in perspective.

Referring now to the figures, which are for the purposes of illustrating the present invention and not for limiting same, FIG. I depicts a liquid level control system 10 in accordance with an exemplary embodiment and the principles of the present invention. Included are a fluid-holding vessel 20, a fluid inlet line 30 for bringing fluidized material into vessel 20, a fluid pump 40 for discharging fluid material from vessel 20 via a discharge line 50, a typical junction box 60 having a power cord 70 for connecting with a power source (not shown), a switch cord 80, which can be any suitable length for connecting the pressure activated control apparatus, shown generally at 100, with the junction box 60, and a vent line 90 for venting air from within the pressure activated control 100 and as a source of fresh outside air thereto. The flange 22 radially extending outwardly from around the top of vessel 20 can be connected with a vessel lid (not shown) to make an enclosed fluid vessel. In addition, a bracket 102 can connect the pressure activated control apparatus 100 to the interior wall of the vessel 20 where desired, such as by screws, rivets, bonding or some other means of attachment, such that the pressure activated control 100 is maintained substantially in a vertical orientation. Similarly, screws (such as 103 in FIG. 2), or thumb screws (not shown) can be used to clamp, or otherwise connect, pressure activated control apparatus 100 to bracket 102.

Furthermore, the vessel 20 represents any type of open or enclosed fluid-holding vessel or reservoir for use in the system 10 wherein fluid level is indicated or controlled, such as within a desired range of fluid levels. System 10, therefore, may represent a septic tank, a liquid storage tank, cistern for water or other liquid or solution, a lift station, a sewage basin, or any other system wherein fluid level information is important for a system operator to know or where it is to be controlled. In system 10, when fluidized material enters inflow 30 and the level of fluid is raised to a sufficient level, pressure activated control 100 senses the rise in fluid level via a corresponding rise in fluid pressure and a switch is triggered therein (the operation of pressure activated control 100 and details of the switching mechanism will be more fully described infra). The pump 40 is switched on and fluid material is discharged from vessel 20 via discharge line 50. When a sufficient amount of fluid is discharged, the pressure activated control senses a corresponding drop in fluid pressure and can trigger another switch, which turns the pump off. Of course, an alternative would be for the pump to turn on for a controlled amount of time at a known pump discharge rate, and then shut off. This would require additional controls (not shown).

Figure 2:
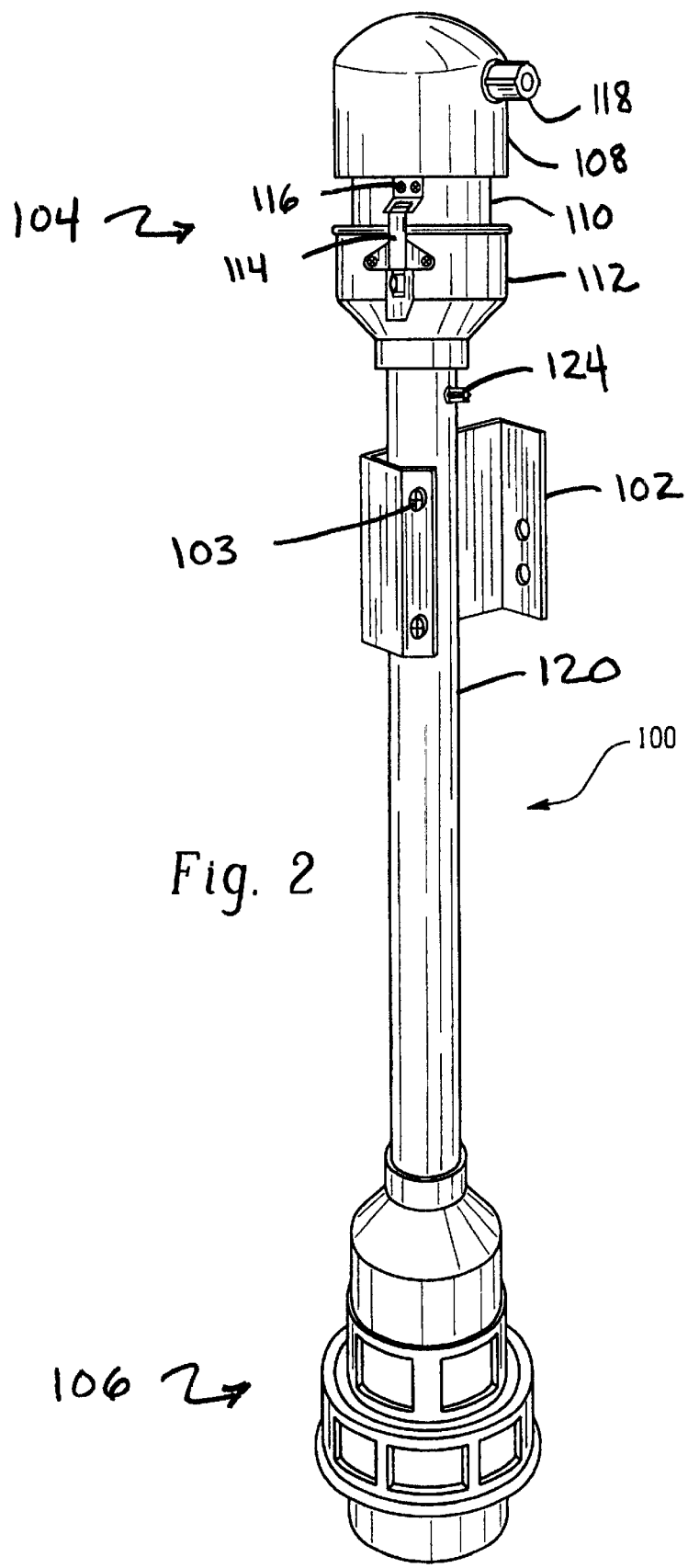
FIG. 2 is a perspective view of an exemplary embodiment of the present invention.
Figure 3A:
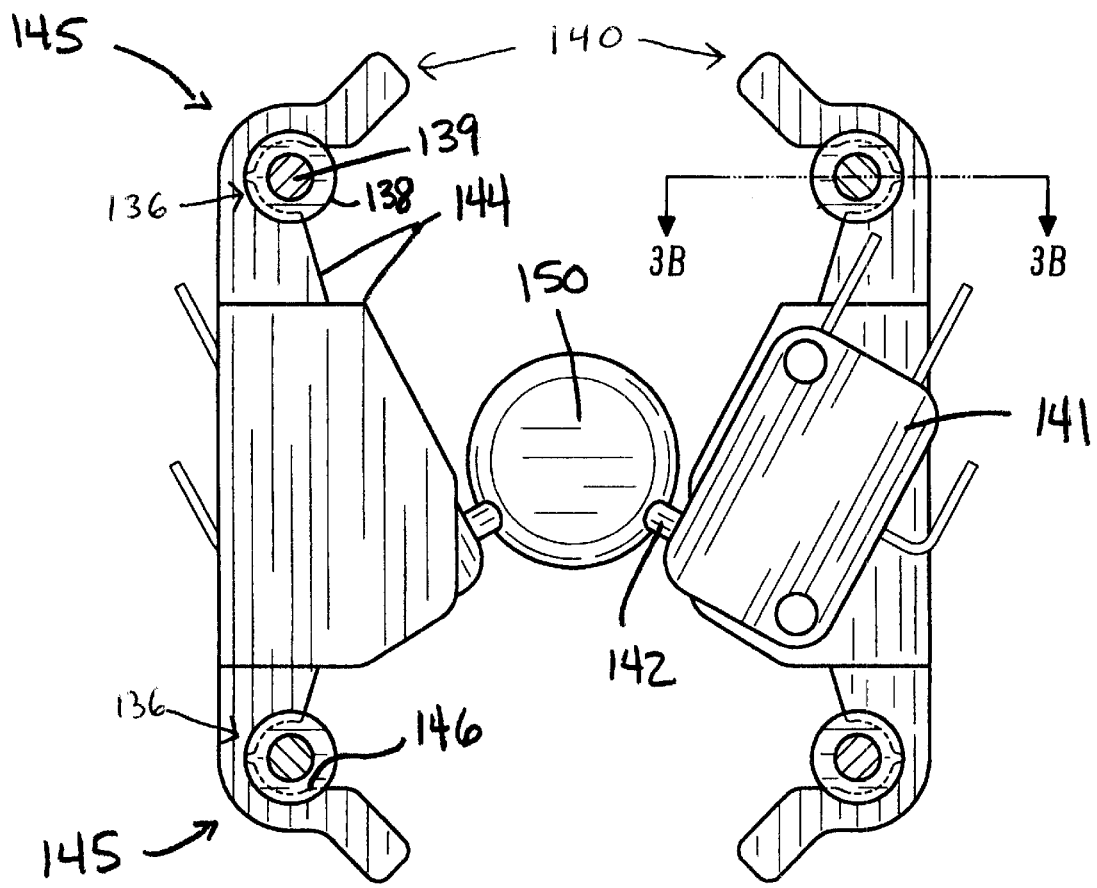
FIG. 3A is an enlarged partial section side view taken along section line 3A—3A from FIG. 3.
Figure 3B:
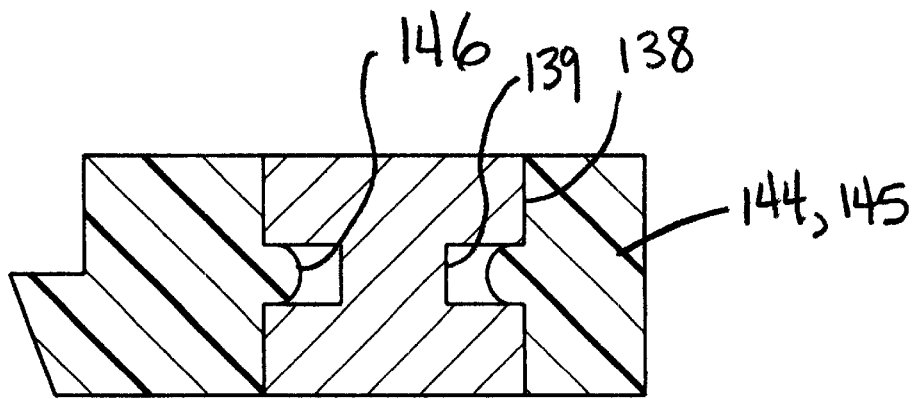
FIG. 3B is an enlarged view taken along section line 3B—3B from FIG. 3A.
Figure 4:
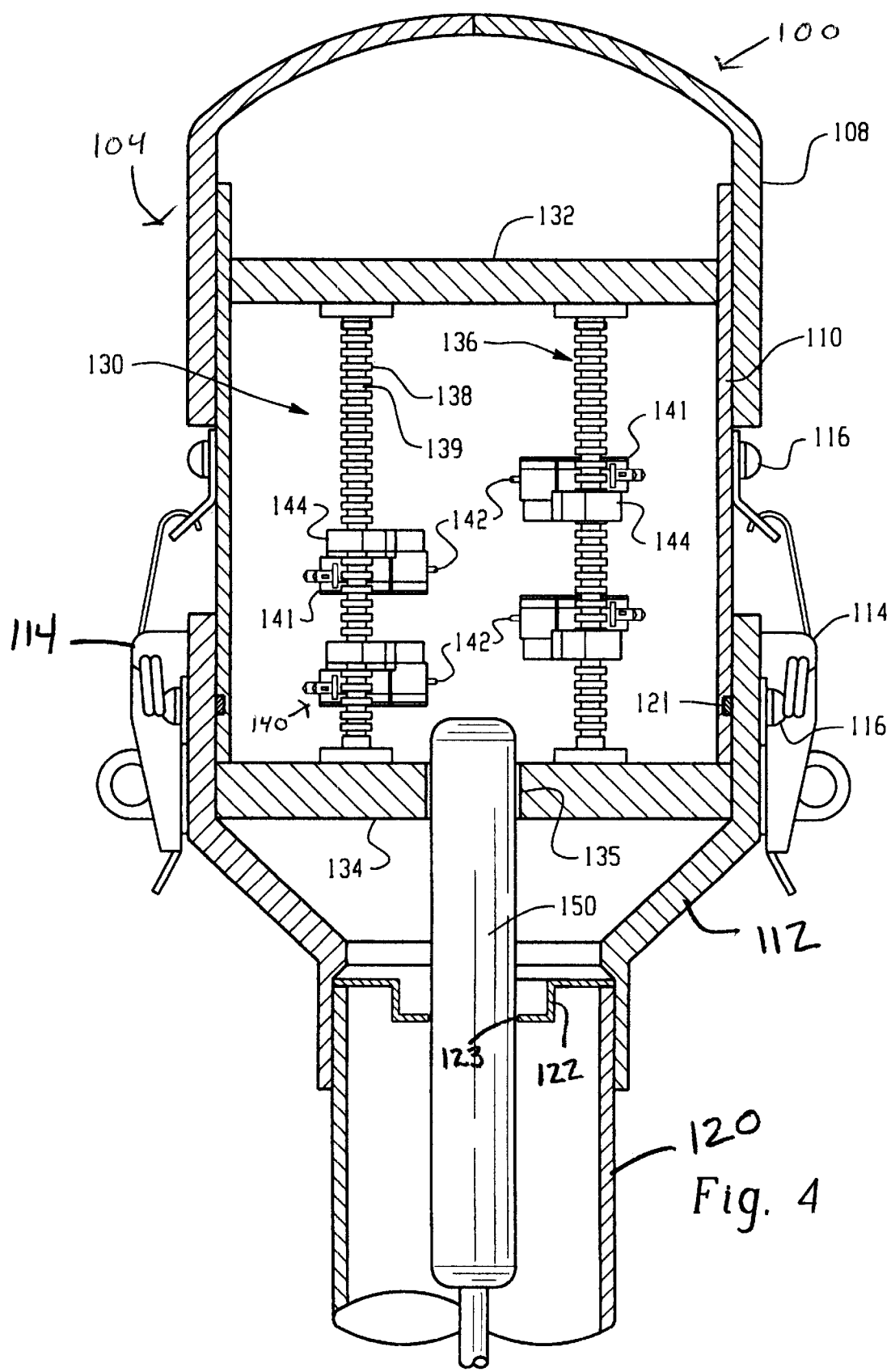
FIG. 4 is an enlarged view of the head assembly of the apparatus as encircled in the FIG. 3 depiction.

Referring now to FIGS. 2–4 for the details of the pressure activated control 100, which is a pressure sensing and switching apparatus. The illustrated embodiment of the apparatus has a head assembly 104 and a lower unit 106. A spacer 120 connects the head assembly to the lower unit 106.

Figure 7:
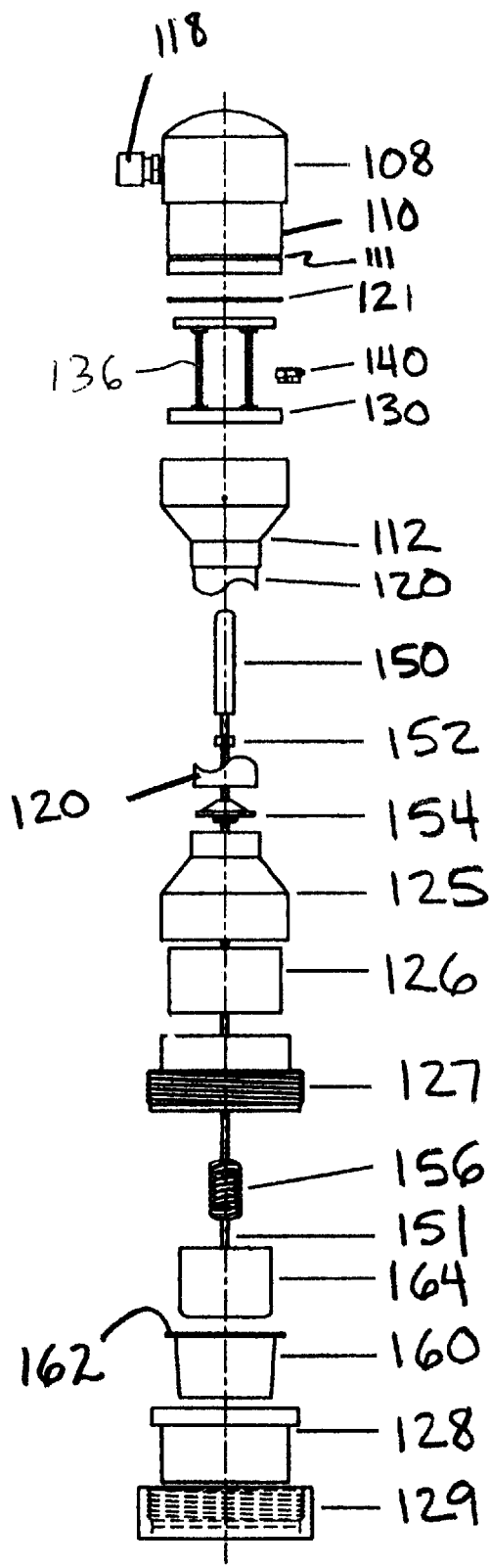
FIG. 7 is an exploded side view of an exemplary embodiment of the apparatus of the present invention.

Head assembly 104 includes a top cap 108, a coupler 110 and a top reducer 112. All three pieces, 108, 110 and 112, can be of affordable PVC construction, which, in certain sizes, are commercially available, or of some other suitable plastic or other material. For example, top reducer 112 may be a standard four inch by two inch PVC reducer, with a four inch coupler 110 made of standard PVC conduit stock, and having available top caps, such as top cap 108 to fit therewith. The top cap 108 and coupler 110 can be connected together, such as by solvent welding, or by some other known method of plastic bonding, such as using ultrasonics, heat, adhesives, a machined threaded connection or even mechanical clamps. Top cap 108 has a switch cord connection 118 (for connection with a corresponding switch cord, such as 80 in FIG. 1). Top coupler 110 fits closely within the top portion of top reducer 112 and is releasibly connected therewith such as by a pair of latches 114 (FIG. 4). The pair of mechanical latches 114 can be connected, such as with standard screws 116, to the top coupler 110 and top reducer 112 as illustrated, with each being opposed one hundred eighty degrees around top coupler 110 Ad and top reducer 112 from each other. As shown in FIG. 7, an O-ring 121 is provided to fit around and be carried by, a groove 111 in the cylindrical top coupler 110 to facilitate sealing of top coupler 110 to top reducer 112 when latched.

Figure 6:
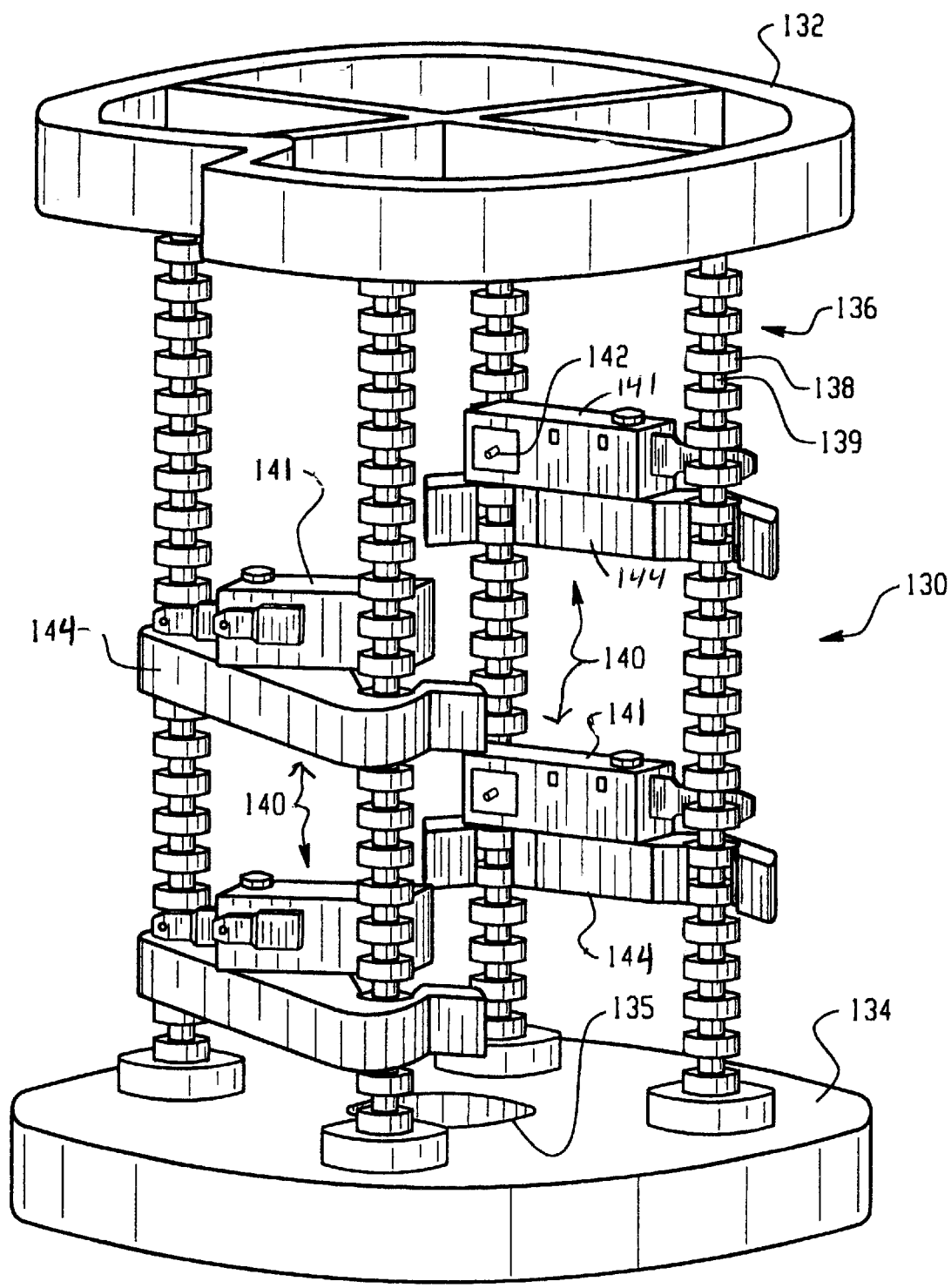
FIG. 6 is an enlarged perspective view of the switch track assembly of the present invention.

Referring now to FIGS. 4 and 6 an exemplary embodiment of a switch track assembly 130 is housed inside head assembly 104. The switch track assembly is easily serviceable by an operator without any tools by simply unlatching latches 114, removing top cap and top coupler 108 and 110, respectively, and removing the switch track assembly 130 for servicing. In the illustrated embodiment, switch track assembly 130 includes a top 132, a bottom 134 and four switch track rods 136 for connecting with the top and the bottom, such as by solvent welding, and for releasibly carrying one or more microswitch assemblies 140 (FIG. 7) thereto. Bottom 134 is slightly larger in diameter than top 132 such that top coupler 110 retains and centers switch track assembly 130 to top reducer 112 (see FIG. 4), such that bottom 134 can rest just within the conical portion of top reducer 112 where the reduction in diameter begins. In this manner, switch track assembly 130 is automatically centered to top reducer 112 when opposed latches 114 connect top coupler 110 to top reducer 112, thereby sandwiching a portion of bottom 134 between therein. Bottom 134 includes a central hole 135 for plunger 150 to fit through when it is displaced vertically upward in response to fluid pressure to trigger protruding triggers 142 on microswitches 141 (FIG. 3A).

Referring now to FIG. 6, a pair of adjacent switch track rods 136 are used to carry each microswitch assembly 140. Each switch track rod 136 is identical and includes a plurality of alternating larger diameter sections 138 and smaller diameter sections 139. Each microswitch assembly 140 can be identical as well and includes a microswitch 141 with protruding trigger 142 and a switch coupler 144 connected therewith. Microswitches 141 can be any of a number of highly-reliable, commercially-available microswitches suitable for a desired function. These can be related for three million or more switching cycles. In a typical sewage tank system, the switch may be activated to turn on a pump, e.g., ten times per day, for example. Switch couplers 144 can be molded of flame-resistant ABS plastic construction, or of another suitable material. Each microswitch 141 is connected, such as by adhesive bonding, to a switch coupler 144.

As shown in FIGS. 3A and 3B, each switch coupler 144 has a pair of snaps 145 for connecting the switch assembly 140 to a pair of adjacent switch track rods 136. Each snap 145 is designed to fit snugly around a majority portion, such as about two hundred forty degrees, of two adjacent larger diameter sections 138 of a switch track rod 136. In such an embodiment, there would be approximately sixty degrees of squeeze contact of the snap 145 with the switch track rod 136. Each snap 145 can include a centering or positioning ring or bead 146 that fits in the smaller diameter section 139 between the two adjacent larger diameter sections 138 that assists with centering the snap 145 and helps keep it from sliding out of the desired location along the switch track rod 136. The snap 145 uses the memory of the plastic to act like a living hinge.

In one exemplary embodiment of the present invention (such as illustrated in FIG. 4), four microswitches 141 can be provided representing, from lowest to highest elevation along a switch track assembly 130: off, pump 40 on one, pump 40 on two (many commercial pumps can have two speeds, or a second pump could be used, which is not shown), and an alarm, respectively. Such is a common set up in sewage tank systems (FIG. 1) thereby making for easy retrofit of tilt style float switch sewage tank systems with the present inventive pressure control apparatus 100. Pressure control apparatus 100 can simply replace the tilt style float switches and be wired to the existing control system. Servicing the system and adjusting the switch assemblies 140 and corresponding fluid control or sensed levels can be done simply and in the field, without any tools. In another possible system embodiment for sensing fluid level and indicating the same, fourteen microswitches 141 can be provided (not shown). Such a system could be employed to represent a series of fluid elevations on an indicator panel and have an alarm level, e.g. As shown in FIG. 7, longer piston assemblies (rods 151 or plunger 150 or both) and switch track assemblies 130 (via longer switch track rods 136) could be substituted, thereby allowing more room for microswitches 140 and more range of fluid level representation and control.

As shown in FIG. 4, the top reducer 112 is connected, such as by being solvent welded, or otherwise bonded, to a spacer 120, which can also be of affordable PVC, commercially available stock. Spacer 120 can be constructed of commercially available two inch PVC conduit, e.g. In addition, spacer 120 can be of any desired length. Connected between top reducer 112 and spacer 120 is a plunger centering bracket 122 with a circular hole 123 centered therein to keep the plunger 150 centered within spacer 120. The plunger 150 is of a slightly smaller diameter than the hole 123, such that a fluidic bearing can be created wherein the plunger 150 can ride upwardly surrounded by air instead of contacting sides of hole 123. This ensures proper switch trigger 142 actuation by the plunger 150. In addition, as the plunger moves upwardly toward microswitches 140, a volume of air is being displaced within apparatus 100 (to be described in detail infra). As shown in FIG. 1 a vent port 124 is provided to vent this displaced air. The vent port 124 can be connected to a vent line 90 to vent the displaced air external to the enclosed fluid-holding vessel, e.g., and to serve as a source of fresh air when the plunger goes down in response to a decrease in fluid level (again, described more fully infra). In addition, the volume of displaced air as plunger 150 moves upwardly can only be vented at a certain rate. Therefore, plunger 150 is somewhat dampened from extremely sudden and potentially damaging, forceful upward movement by the venting air through vent port 124.

Figure 5:
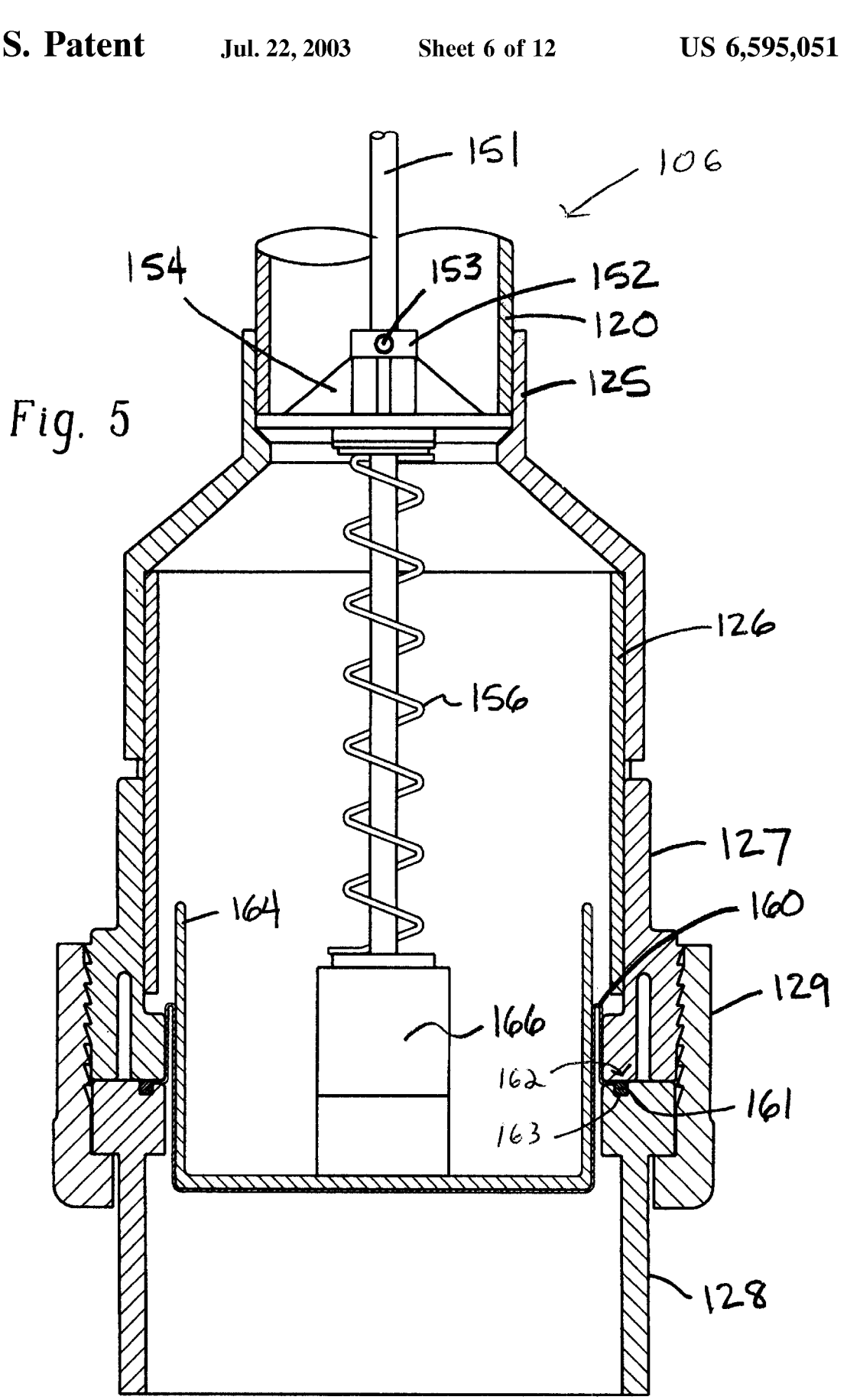
FIG. 5 is an enlarged view of the lower portion of the apparatus as encircled in the FIG. 3 depiction.

Referring now to FIGS. 5 and 7, the lower unit 106 of the exemplary embodiment of the present invention includes a housing that includes a bottom reducer 125, a bottom coupler 126, an upper and a lower seal plate, 127 and 128, respectively, and a union nut 129. Each part can be made of commercially available PVC components to reduce costs. Spacer 120 is connected to lower unit 106 at bottom reducer 125, such as by a solvent weld, or other manner of attachment as described supra for connecting spacer 120 and top reducer 112, e.g. Similarly, bottom reducer 125 is connected to bottom coupler 126 via a solvent welded connection or via other suitable means of attachment. Bottom coupler 126 is similarly connected to upper seal plate 127 via a solvent welded connection, or via other suitable means.

Apparatus 100 of the illustrated embodiment has a first resilient member in the form of a bellofram 160, which is a highly pliable rolling diaphragm of elastomeric material, such as nitrite butadience, acrylinitrile, Viton® (Dupont Dow Elastomers L.L.C.), or any other suitable elastomeric material, and is selectable based on the expected environment of operation. That is the specific elastomeric material chosen for the bellofram 160 can be based on the thermal and chemical environments, e.g., to which it is expected to be exposed to in service. Bellofram 160 is in the shape of a top hat and has a peripheral, outwardly extending flange 162 at its open end. Upper and lower seal plates 127 and 128 are connected together via a threaded connection between union nut 129 with upper seal plate 127. Flange 162 and an O-ring 161 in groove 163 of lower seal plate 128 are clamped between upper and lower seal plates 127 and 128, thereby providing a fluid tight seal and preventing fluid intrusion to the interior of the connection. Bellofram 160 can be accessed via the threaded connection between union nut 129 and upper seal plate 127 for ease of serviceability, however, bellofram 160 is extremely durable and should last for the life of the system. For example, a nitrite version of bellofram 160 is estimated to last for one million cycles, or more. However, should it tear from a sharp object or otherwise need servicing, apparatus 100 can be removed from service and union nut 129 can simply be unscrewed to get access to and replace bellofram 160 with a new one.

Apparatus 100 is sealed from the fluid on its interior and only outer surfaces of bellofram 160, lower unit 106, and a portion of spacer 120 are ever exposed to the fluid (see FIG. 1, e.g.). The pressure activated control apparatus 100 of the present invention has at least a portion of its lower unit 106 and all of the exposed outer surface of bellofram 160 submerged in the fluid. As such, pressure activated control 100 works on average pressure of the fluid on the exposed bellofram 160 and is unaffected by surface turbulence and the greasy layer of surface material often found in sewage tanks, e.g.

A push cup 164, such as of molded ABS or Lexan® (General Electric Company) plastic construction, is connected to a rod connector spacer 166. Rod connector spacer 166 is connected to a rod 151, which rod 151 is connected at a distal end to plunger 150. Rod 151 can be made of commercially available aluminum bar stock, such as from one-quarter inch bar, and cut to desired length. Together, rolling diaphragm, or bellofram, 160, push cup 164, rod connector spacer 166, rod 151 and plunger 150 function as a piston with negligible friction that is responsive to the fluid pressure against the bellofram 160 such that plunger 150 may trigger switches 140 (FIG. 6) on an upstroke resulting from increased fluid level. Bellofram 160 simply rolls and unrolls freely.

In the illustrated embodiment of the inventive pressure control apparatus 100, a second resilient member in the form of a spring 156 provides an opposing or biasing force in a direction opposite the force exerted on the exposed outer surface area of the bellofram 160 that is exposed to the fluid pressure. That force exerted by the fluid pressure on the exposed area of the bellofram 160 is translated to the push cup 164 to move the plunger 150 (FIG. 4) upward against the biasing force of the spring 156. Spring 156 acts against a retained member such as an annular spring plate 154 to provide the biasing force against the push cup 164. Spring plate 154 has a centrally located through-hole (not shown) for the rod 151 to freely slide through. A volume of air is displaced from within bellofram 160 during upward movement of rod 151 and plunger 150 that goes through this hole in the spring plate. Rapid upward movement of rod 151 and plunger 150 is dampened by the rate at which air can vent through this hole in spring plate 154 and out vent port 124 (FIG. 2). Spring plate 154 may be formed of molded ABS or Lexan® (General Electric Company) plastic construction as well, and is connected between spacer 120 and bottom reducer 125.

The spring 156 may be chosen with any spring constant, k, as desired to give the desired range of fluid levels to be sensed. For example, in one embodiment of apparatus 100 with a first spring 156, four inches of total plunger travel to activate switches 141 (FIG. 4) equates to about eighteen inches of fluid range that can be sensed. In another embodiment with a stiffer spring 156 (different spring constant, k), approximately forty-two inches of fluid can be sensed in the same four inches of plunger 150 travel. Of course, those ranges are based on one switch 141 being connected at the bottom of two adjacent switch track rods 136 while another switch 141 is connected near the top larger diameter portions, or rungs, 138 of two switch track rods 136. Furthermore, further ranges of sensed fluid levels for indicating or controlling fluid levels, e.g., could be established with apparatus 100 by simple replacement of spring 156 with a spring having a different "k" value. Pressure control apparatus 100 is adjustable and adaptable to a user's specific needs. It can be used to sense fluid pressure and indicate or control fluid levels on a ratio of greater than one-to-one of fluid level to switch elevation, overcoming the limit of available float style switches.

In addition, since switches 141 are adjustable anywhere along switch track rods 136, any number of desired intermediate levels of fluid level between eighteen and forty-two inches, for the two spring examples, can be sensed and controlled by simple switch 141 re-positioning along the switch tracks 136. Switch track assembly 130 has twenty-one different switch positions possible with up to fourteen total switch assemblies 140 that can be mounted thereon.

Rolling diaphragm or bellofram 160, preferably never completely unrolls to, or is stretched beyond, its relaxed position, or rolls completely upward. In accordance with the illustrated embodiment in FIG. 5, pressure control apparatus 100 includes a rod collar 152 attached to rod 151, such as by a clamping screw 153 that limits the downward stroke of the push cup 164 and bellofram 160 to prevent the bellofram from completely unrolling and from being stretched. Similarly, the upward limit of plunger 120 is limited by the top 132 (FIG. 4) of switch track assembly 130, such that bellofram 160 is prevented from being stretched. In an embodiment of the pressure control apparatus 100, over forty cubic inches of air from inside the rolled bellofram 160 during a sensed increase in fluid pressure is displaced and must be vented through vent port 124 with or without a corresponding vent line 90 (FIG. 1).

Figure 8:
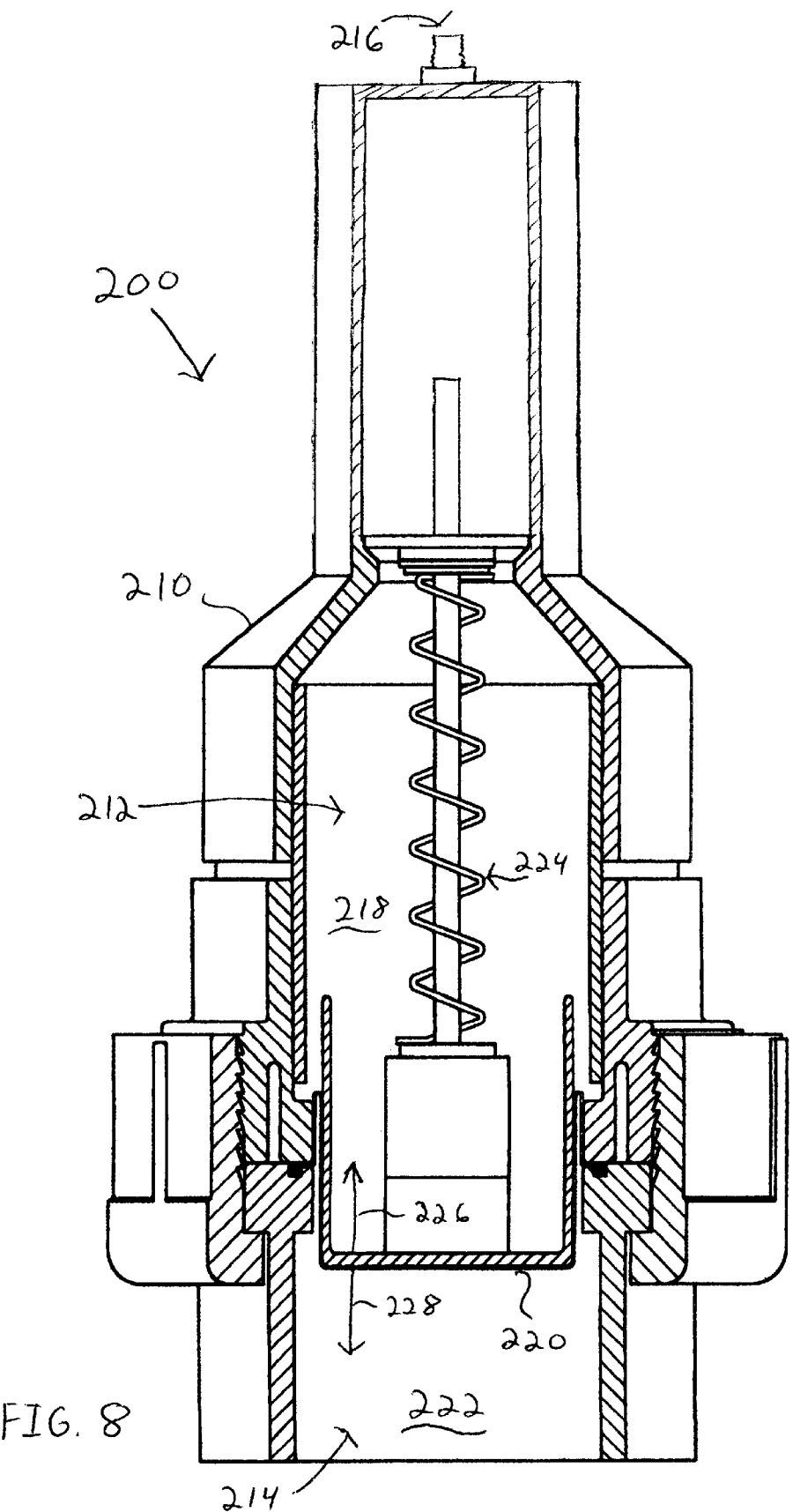
FIG. 8 is a sectional side view of an example of pressure responsive device.

FIG. 8 shows an alternative exemplary embodiment of a fluid level sensing and control system of the present invention. Here the system includes a pressure responsive device 200 which is similar in construction to the previously described lower unit 106 of the pressure active control 100. The pressure responsive device 200 includes a housing 210. The housing 210 includes a cavity 212 therein which is filled with a gas schematically indicated 218. The housing further includes a first opening 214 and a second opening 216. As discussed previously, the housing includes a diaphragm 220 such as the previously described rolling diaphragm or bellofram 160. The diaphragm 220 is in sealing engagement with the first opening 214 and is operative to prevent a liquid 222 outside of the cavity from flowing into the cavity through the first opening 214. Portions of the diaphragm 220 responsive to external fluid pressure of the liquid 222 are caused to move in an inward direction indicated 226 with respect to the opening 214. Such movement further decreases the volume of the cavity 212. The decrease in volume of the cavity 212 causes the pressure of the gas 218 in the cavity to increase.

The device 200 also includes a biasing member 224 in operative connection with the housing 210 and the diaphragm 220. The biasing member 224 is operative to urge the portions of the diaphragm 220 to move in an outward direction 228 with respect to the opening 214 which increases the volume of the cavity 218. The increase in volume of the cavity 212 causes the pressure of the gas 218 to decrease. The position of the diaphragm and the resulting pressure of the gas 218 is a function of the relative forces and pressures of the external liquid 222 the gas 218 and the biasing member 224 acting on opposed sides of the diaphragm 220.

Figure 9:
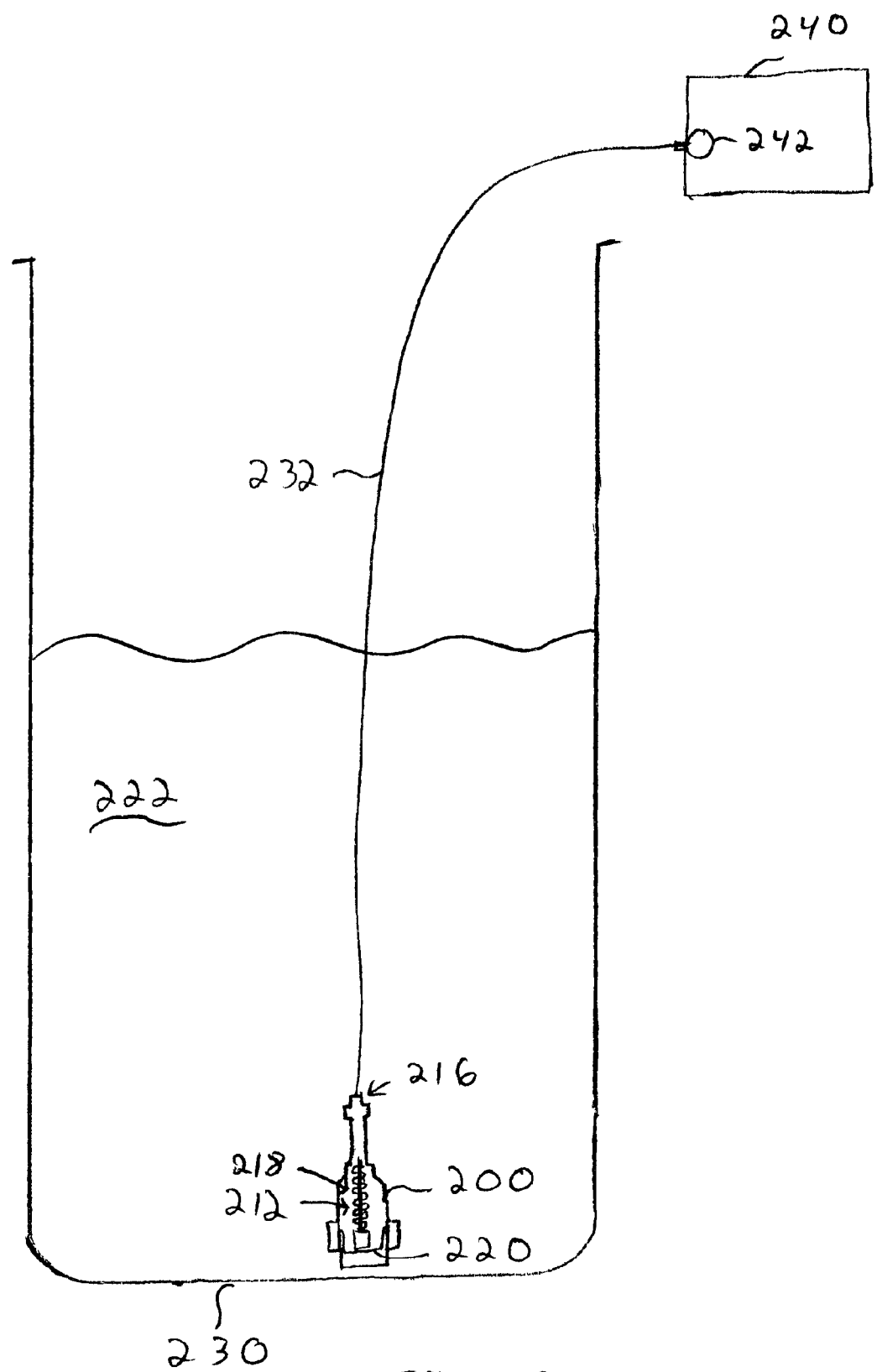
FIG. 9 is a sectional view of a fuel level sensor and control system.

As shown in FIG. 9, exemplary embodiments of the device 200 may be placed adjacent the bottom of a reservoir 230. As the depth of the liquid 222 increases or decreases, the pressure of the liquid acting on the diaphragm will increase or decrease respectively. When the diaphragm moves inwardly or outwardly responsive to the pressure of the liquid, a corresponding increase or decrease in the pressure of the gas 218 within the device will result. Consequently, the pressure of the gas 218 will be relatively higher when the depth level of the liquid 222 in the reservoir is higher and the pressure of the gas 218 will be relatively lower when the depth level of the liquid 222 in the reservoir is lower.

In this described exemplary embodiment of device 200, a hollow tube or hose 232 is placed in fluid tight connection between the second opening 216 in the housing of the device 200. The hose is fluidly connected to a control device 240. The hose has a sufficient length to extend out of the reservoir 230 so that the control device 240 may be conveniently accessed by an operator outside of the reservoir. In the exemplary embodiment, the control device includes a gas pressure transducer 242. The hose 232 is operative to place the transducer 242 in fluid communication with the cavity 212.

In the exemplary embodiment, the transducer is a sensor which is operative to generate an electrical signal responsive to the relative magnitude of the pressure of the gas 218 within the cavity 212 and hose 232. The exemplary embodiment of the controller is operative responsive to the electrical signal from the transducer to determine the level or depth of the liquid in the reservoir. The controller is further operative responsive to the determined level of the liquid to activate one or more switches controlling devices which cause the delivery into or outflow of liquid from the reservoir 230.

Figure 10:
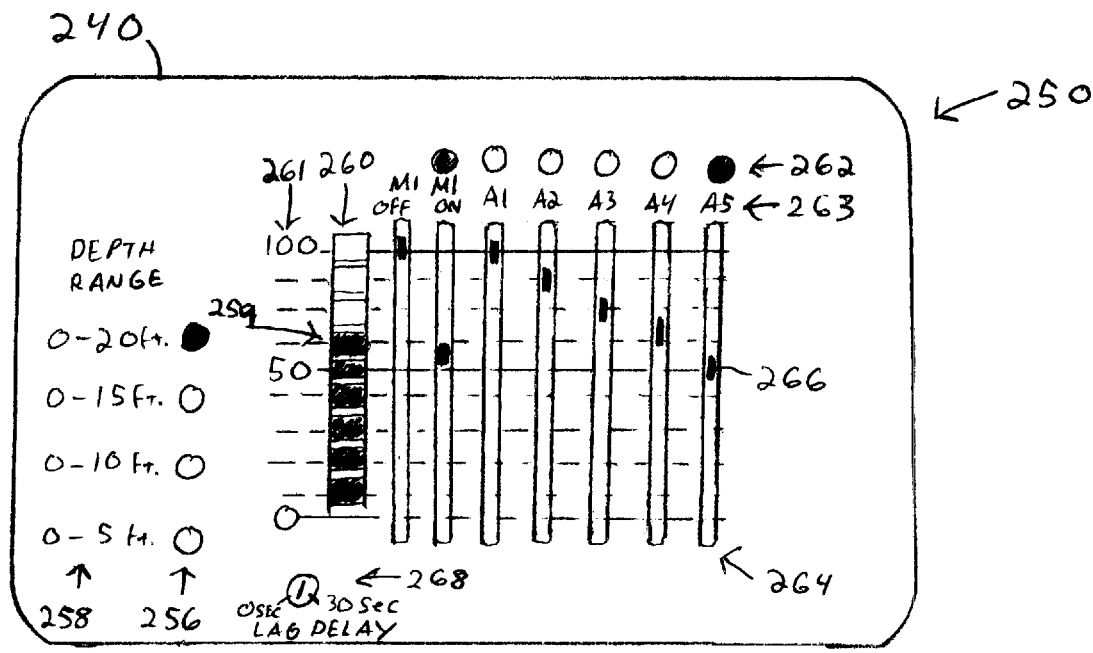
FIG. 10 is a front view of a control device.

FIG. 10 shows a front view 250 of an exemplary embodiment of the controller 240. Here the controller includes a plurality of visual output devices 256, 260, 262 which display information about the level of the liquid in the reservoir and the status of one or more switches that are operated by the controller responsive to the level of the liquid in the reservoir.

Figure 11:
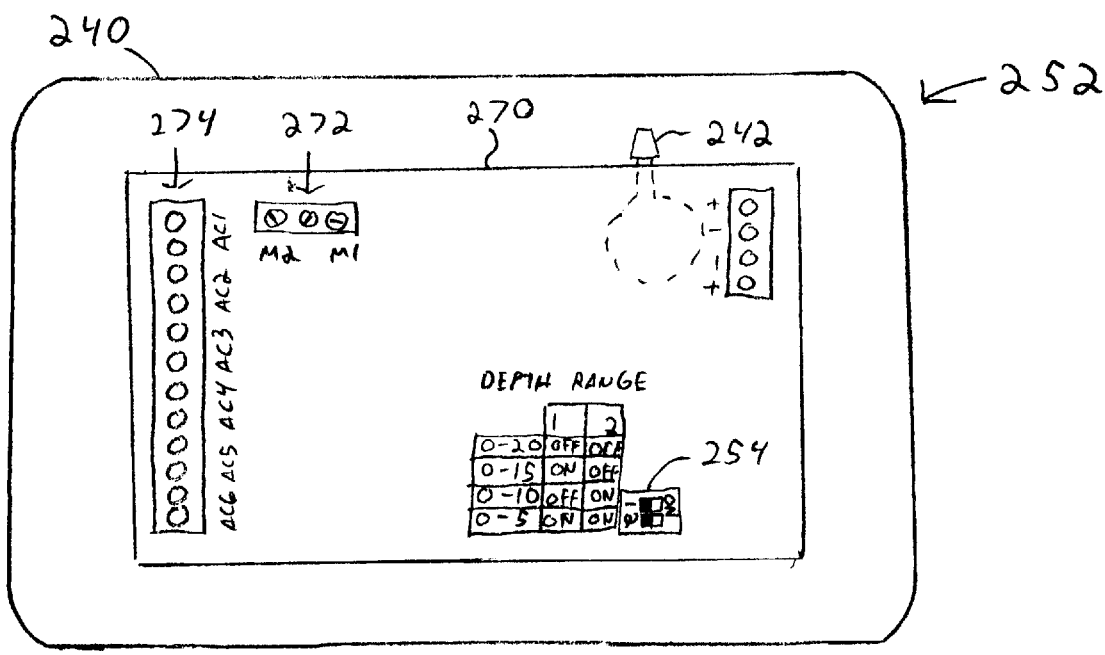
FIG. 11 is a back view of a control device.

FIG. 11 shows a back view 252 of an exemplary embodiment of the controller 240. Here the exemplary controller 240 includes circuit board 270 in operative connection with the transducer 242, a plurality of switches 272, 274, and a depth range selection device 254. In the exemplary embodiment, the depth range selection device 254 is manually configurable by an operator to select one of a plurality of depth ranges. In this described exemplary embodiment, the depth range selection device 254 includes a dip switch, however alternative exemplary embodiments of the present invention may include other forms of selection devices including toggle switches, pots, buttons, or any other input device which is operative to enable an operator to select a depth range.

The selectable depth range corresponds to the desired depth range of the liquid in the reservoir being monitored and controlled by exemplary embodiments of the present invention. In this described exemplary embodiment these selectable depth ranges include ranges of: 0–20 feet, 0–15 feet, 0–10 feet, and 0–5 feet. However it is to be understood that in alternative embodiments, more ranges, less ranges and different types of ranges of liquid depths may be selectable by the controller. For example an alternative exemplary embodiment may include an input device that enables an operator to input into a memory of the controller 240, a specific number that corresponds to a desired depth level or measurement for the liquid in the reservoir.

In this described exemplary embodiment, the controller 250 is responsive to the selected one of the depth ranges to output through at least one display device a visual indication that is representative of the selected depth range. For example, as shown in FIG. 10, the exemplary embodiment of the controller includes display devices such as a plurality of LEDs 256. Each of these LEDs corresponds to a different depth range. The controller is operative to light the particular LEDs which corresponds to the selected depth range. Labels 258 adjacent the LEDs 256 enable an operator to quickly identify which depth range has been selected.

The exemplary embodiment of the controller is operative to determine what fraction of the selected depth range corresponds to the depth level of the liquid in the reservoir as measured by the exemplary pressure responsive device 200. This determination is made responsive to the depth range selected with the depth range selection device 254, and responsive to the electrical signals produced by the transducer 242. As discussed previously, the transducer produces electrical signals responsive to the pressure of the gas within the cavity of the pressure responsive device 200. The pressure of the gas within the cavity is a function of the depth of the liquid. In the exemplary embodiment the controller is operatively configured and/or programmed to determine the depth of the liquid responsive to the electrical signal produced by the transducer and the known, measured, or derived relationships between ranges of pressures in the cavity of the device and corresponding ranges of depths of the liquid. By dividing the determined depth level of the liquid in the reservoir by the selected depth range, the exemplary embodiment of the controller is operative to calculate the fraction of the selected depth range that corresponds to the measured depth level of the liquid in the reservoir.

In this described exemplary embodiment the controller 250 is operative to output through at least one display device a visual indication that is representative of the fraction of the selected depth range that corresponds to the current measured depth level of the liquid in the reservoir. For example as shown in FIG. 10 the exemplary embodiment of the controller includes display devices such as a plurality of aligned LEDs 260. Each of these LEDs corresponds to a different percentage ranging from 0 to 100% of the selected depth range. The controller is operative to light the particular LEDs which corresponds to the determined fraction of the selected depth range corresponding to the currently measured depth level of the liquid in the reservoir. Labels 261 adjacent the LEDs 260 enable an operator to quickly identify the current depth level of the reservoir as a percentage of its expected depth range. Thus if only LEDs 259 adjacent and below the label of 50% are lighted, an operator can quickly determine that the reservoir is only half full.

Controller 240 further includes a plurality of depth level threshold selection devices 264. In the exemplary embodiment, a depth level threshold selection device 264 includes a manually operated slider mechanism which can be manipulated to select one of a plurality of different levels by moving a slider handle 266 up or down in an elongated slot. The relative positions of a slider handle 266 of the slider mechanism corresponds to percentages of a selected depth range for the reservoir. For example, when the slider handle 266 is moved to the top most position, the slider mechanism is operative to electrically indicate to the controller a depth level threshold of 100% of a selected depth range. When the slider handle is slid to the bottom most position, the slider mechanism is operative to electrically indicate to the controller a depth level threshold of 0% of a selected depth range. Slider handle positions in between the top and bottom positions linearly correspond to percentages of the depth range between 0% and 100%.

The exemplary embodiment of the controller 240 is operative to trigger the contacts of switches 272, 274 responsive to the depth level thresholds indicated by the positions of the depth level threshold selection devices 264. In this described exemplary embodiment, there is a one-to-one correspondence between each selection device 264 and each of the switches 272, 274. Thus each slider mechanism is operative to control the triggering of a switch. When the measured depth level of the liquid in the reservoir breaches one or more of the depth level thresholds indicated by the positions of the depth level threshold selection devices, the exemplary embodiment of the controller is operative to electrically trigger the corresponding switches.

It is to be understood that the term "breaching" as used herein is defined as the point when the measured depth level either reaches or crosses a threshold. Thus when a measured depth level first reaches and/or crosses above a set depth level threshold set at 50%, the exemplary embodiment of the controller is operative to trigger a switch to change states such as from a state of "off" to a state of "on". When the depth level moves in the opposite direction and reaches and/or crosses below the set depth level threshold of 50%, the exemplary embodiment of the controller is operative to trigger the switch to change to an opposite state such as from the state of "on" to the state of "off".

Each switch of the exemplary embodiment of the controller includes a pair of terminals. External devices which are electrically controlled may be connected to the terminals. Such external devices may include pumps, valves, alarm systems or any other type of device which may be useful in controlling and managing the depth levels of liquids in reservoirs. In one exemplary embodiment a pump may be electrically coupled through an appropriate relay to the switch terminals of the controller. For example, when the determined depth level of a liquid in a reservoir drops to below a set depth level threshold, the controller is operative to trigger a switch connected to a pump. The pump may then be turned on responsive to triggering of the switch and begin pumping more liquid into the reservoir. As the liquid level increases, the determined depth level of the liquid will eventually move above the set depth level threshold. As a result the switch will be triggered in to an opposite state and the pump will be turned off in response thereto.

In this described exemplary embodiment, the controller 250 is operative to output through at least one display device at least one visual indication that shows the current state of each of the switches. For example, as shown in FIG. 10, the exemplary embodiment of the controller includes display devices such as a plurality of LEDs 262. Each of these LEDs corresponds to a different one of the switches 272, 274. The controller is operative to light the particular LEDs 262 which corresponds to those switches that have been turned on in response to a set depth level threshold being breached. Labels 263 adjacent the LEDs 262 enable an operator to quickly identify which of the switches have been turned on by the controller.

The exemplary embodiment of the controller further includes a lag delay switch selection device 268. The lag delay switch selection device 268 includes a manually rotatable component which enables selection within a range of different time delay values as it is rotated. The angular position of the selection device corresponds to different periods of time delay for triggering switches. When a depth level threshold is first breached the exemplary embodiment of the controller is operative to wait a length of time corresponding to the time delay indicated by the lag delay switch selection device 268. If during the time delay, the depth level moves back to a level that does not indicate breach of the depth level threshold, the exemplary embodiment of the controller is operative to cancel the triggering of the switch. The exemplary embodiment of the lag delay switch includes a device operative to select a time delay of from 0 to 30 seconds.

The time delay feature of the exemplary embodiment is generally useful for sensing levels in reservoirs which have turbulent liquid flows that may cause large fluctuations in pressures adjacent the diaphragm of the pressure responsive device 200. Such pressure fluctuations may cause the controller to quickly switch a pump on and off for many cycles. Such frequent cycling may reduce the useful life of the pump. The exemplary controller responsive to the lag delay switch 268 is operative to confirm that a pressure change remains above or below a set depth level threshold for the selected time delay before switches are triggered. As a result transitory fluctuations in pressure are less likely to cause a pump, valve, alarm or other device to be needlessly turned on and off in quick succession.

Although the exemplary embodiment has been shown with certain types of display devices, switches and manual controls, it is to be understood that in alternative exemplary embodiments of the present invention the controller may include any other display devices, gauges, visual indicators, input devices, switch controls, and selection devices that are operative to output and/or accept information for configuring and monitoring the controller.

Figure 12:
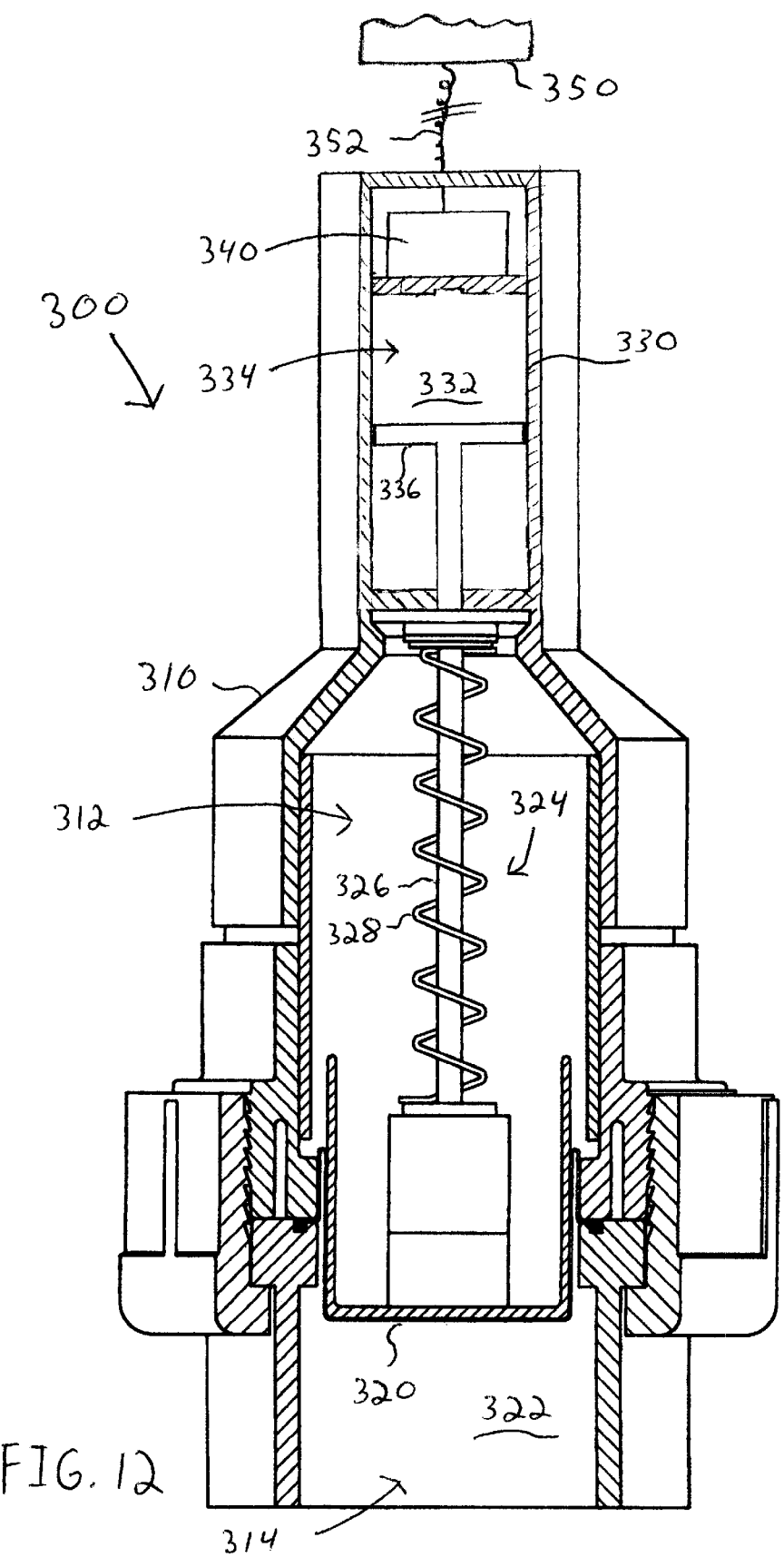
FIG. 12 is a sectional view of a further exemplary pressure responsive device.

In further exemplary embodiments of the present invention the described controller may be configured to work with alternative types of pressure responsive devices. FIG. 12 shows an example of an alternative exemplary embodiment of a pressure responsive device 300. The pressure responsive device 300 includes a housing 310. The housing 310 includes a cavity 312 therein. The housing further includes an opening 314 and a diaphragm 320 such as the previously described rolling diaphragm, or bellofram. The diaphragm 320 is in sealing engagement with the opening 314 and is operative to prevent a liquid 322 outside of the housing from flowing into the cavity through the first opening 314.

The device 300 further includes a compression chamber 330 and a biasing member 324. The compression chamber 330 includes a bore 334 and a piston in sliding engagement with the bore. The piston is operative to move within the bore and thereby change an internal volume of the bore. The biasing member 324 is in operative connection between the diaphragm and the compression chamber. The biasing member includes a spring 328 that is operative to apply an outwardly directed force on the diaphragm that is opposite the inwardly directed force resulting from the pressure of a surrounding external liquid schematically indicated 322.

The biasing member further includes a push rod 326. The push rod is in operative connection between the diaphragm 320 and the piston 336. Changes in depth of the liquid 322 are operative to change the pressure of the liquid 322 acting on the diaphragm. Such changes in pressure of the liquid are operative to cause the diaphragm 320 acting through the push rod 326 to move the piston 336 within the compression chamber 330. Increases in the pressure of the liquid 322 acting on the diaphragm are operative to move the piston further into the bore 334, thereby decreasing the internal volume of the bore 334. As the internal volume of the bore decreases, the pressure of a gas 332 within the bore increases. Decreases in the pressure of the liquid 322 acting on the diaphragm are operative to move the piston outwardly with respect to the bore 334, thereby increasing the internal volume of the bore 334. As the internal volume of the bore increases, the pressure of the gas 332 within the bore decreases.

The exemplary embodiment of the device 300 further includes a transducer 340 within the housing. The transducer is in fluid communication with the compression chamber and is operative responsive to the pressure of the gas 332 to produce electrical signals that are representative of the depth level of the external liquid 322. In this described exemplary embodiment the internal volume of the bore 334 is substantially smaller than the volume of the cavity 312 which changes responsive to the movement of the diaphragm 320. Small displacements of the diaphragm 320 thus are operative to produce relatively large percentage changes in the internal volume of bore 334. As a result changes in the pressure of the liquid 322 are operative to produce relatively larger changes in pressure of the gas 332. This magnification of the pressure of the gas 332 with respect to the pressure of the liquid 322 is operative to increase the sensitivity of the transducer with respect to changes in the pressure of the liquid 322.

The previously described controller 240 may be used with this described exemplary embodiment of the device 300. However rather than including the pressure transducer 242 on the controller, an alternative controller 350 may be in operative electrical connection with the transducer 340 within the housing of the device 300. The electrical connection between the controller 350 and the transducer 340 may be encased in a fluid tight tube 352. In alternative exemplary embodiments where no electrical wires may be permitted beneath the surface of the liquid, the device may include a sufficiently long housing 310 and push rod 326 so that the compression chamber 330 and transducer 340 extend above the surface of the liquid 322. In alternative embodiments the transducer may be operative to produce radiation signals such that a fiberoptic connection may extend between the device and the controller. In further alternative embodiments wireless signals may be produced by the device, such as RF signals and received by the remote controller. Such embodiments may avoid the use of electrical connections extending in proximity to the fluid.

Thus the fluid level sensing and control system of exemplary forms of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A fluid level sensing and control system comprising:
   a housing, wherein the housing includes a cavity therein and a first and a second opening to the cavity;
   a diaphragm in sealing engagement with the first opening, wherein portions of the diaphragm are operative responsive to a pressure from a liquid disposed outside the cavity to move inwardly with respect to the first opening to thereby decrease the volume of the cavity;
   a biasing member in operative connection between the housing and the diaphragm, wherein the biasing member is operative to urge the portions of the diaphragm to move outwardly with respect to the first opening to thereby increase the volume of the cavity;
   a transducer in fluid communication with the second opening, wherein the transducer is operative responsive to a pressure in the cavity to produce an electrical signal that is representative of a depth level of the liquid;
   a controller device in operative connection with the transducer, wherein the controller device includes a depth range selection device that is configurable by an operator to select one of a plurality of depth ranges, wherein the controller device is operative responsive to the selected one of the depth ranges and the electrical signal to determine a fraction of the depth range that corresponds to the depth level of the liquid.

2. The system according to claim 1, further comprising:
   a reservoir filled with the liquid, wherein the housing is positioned within the liquid adjacent a bottom of the reservoir, wherein the transducer is positioned outside of the liquid.

3. The system according to claim 2, further comprising at least one pump in operative connection with the controller device, wherein the pump is operative to change the amount of the liquid in the reservoir, wherein the controller device is operative to cause the pump to operate responsive to the determined fraction of the depth range.

4. The system according to claim 2, further comprising at least one valve in operative connection with the controller device, wherein the valve is operative to change the amount of the liquid in the reservoir, wherein the controller device is operative to cause the valve to operate responsive to the determined fraction of the depth range.

5. The system according to claim 2, further comprising an alarm device in operative connection with the controller device, wherein the controller device is operative to cause the alarm to emit an alarm signal responsive to the determined fraction of the depth range.

6. The system according to claim 1, further comprising a hollow tube between the transducer and the second opening.

7. The system according to claim 1, wherein the controller device includes at least one level selection device that is configurable by an operator to select one of a plurality of depth level thresholds, wherein the controller device is operative to trigger at least one switch responsive to the selected one of the depth level thresholds and the determined fraction of the depth range.

8. The system according to claim 7, further comprising at least one display device in operative connection with the controller, wherein the controller is operative to output through the at least one display device a visual representation of the determined fraction of the depth range.

9. The system according to claim 8, wherein the controller is operative to output through the at least one display device a visual representation of the selected one of the depth ranges.

10. The system according to claim 9, wherein the controller is operative to output through the at least one display device a visual representation of which ones of the plurality of switches have been triggered by the controller.

11. The system according to claim 10, wherein the plurality of depth level thresholds correspond to percentages of the selected one of the depth ranges.

12. The system according to claim 7, wherein the controller device includes at least one time lag delay switch selection device that is configurable by an operator to select one of a plurality of time lag delays, wherein the controller is operative to trigger the switch responsive to the determined fluid level continuously breaching the selected one of the fluid level thresholds for an amount of time that corresponds to the selected one of the lag delays.

13. The system according to claim 1 wherein the biasing member includes a spring mounted to the housing within the cavity, wherein the spring is positioned to urge the portions of the diaphragm outwardly with respect to the cavity.

14. A fluid level sensing and control system comprising:
   a housing, wherein the housing includes a cavity and at least one opening to the cavity;
   a diaphragm in sealing engagement with the opening;
   a biasing member disposed within the cavity, wherein portions of the diaphragm are operative to move inwardly and outwardly with respect to the cavity responsive to the opposed pressures of the biasing member and a liquid disposed outside the cavity;
   a transducer in operative connection with the diaphragm, wherein the transducer is operative responsive to movement of the diaphragm to produce an electrical signal representative of the depth level of the liquid adjacent the diaphragm;
   at least one switch;
   a controller device in operative connection with the transducer and the switch, wherein the controller device includes at least one depth level threshold selection device that is configurable by an operator to select one of a plurality of depth level thresholds, wherein the controller device is operative to change an electrical condition of the at least one switch responsive to the electrical signal and the selected one of the depth level thresholds; and
   a compression chamber disposed within the cavity, wherein the compression chamber includes a generally sealed bore with a compressible fluid therein, wherein responsive to movement of the diaphragm an internal volume of the bore is changed, and wherein the transducer is disposed within the housing and is in fluid communication with the internal volume of the bore, wherein the transducer produces the electrical signals responsive to pressure of the compressible fluid within the bore.

15. The system according to claim 14, wherein the compression chamber includes a piston, wherein the piston is in operative connection with the diaphragm, wherein the piston is operative to move within the bore to increase and decrease the internal volume of the bore responsive to the movement of the diaphragm.

16. The system according to claim 14, wherein the controller device includes a depth range selection device that is configurable by an operator to select at least one of a plurality of depth ranges, wherein the controller device is operative responsive to the selected one of the depth ranges and the electrical signal to determine a fraction of the depth range that corresponds to the depth level of the liquid, wherein the depth level thresholds correspond to percentages of the selected one of the depth ranges, wherein the controller is operative to change the electrical condition of the at least one switch responsive to the determined fraction of the depth range breaching the selected one of the depth level thresholds.

17. A method comprising:
   a) enabling an operator to select one of a plurality of different depth ranges for fluid in a reservoir;
   b) enabling an operator to select at least one of a plurality of depth level thresholds, wherein the depth level thresholds correspond to fractions of the selected one of the depth ranges;
   c) generating electrical signals responsive to a pressure of a gas within a cavity of a pressure responsive device, wherein the pressure responsive device is adjacent the bottom of the reservoir, wherein the pressure responsive device includes a diaphragm between the fluid and the gas, wherein the pressure responsive device includes a biasing member acting on the diaphragm which opposes the inward movement of the diaphragm caused by a pressure of the fluid acting on the diaphragm;
   d) determining a fraction of the selected one of the depth ranges that corresponds to the depth level of the fluid in the reservoir responsive to the electrical signals and the selected one of the depth ranges;
   e) determining that the determined fraction of the selected one of the depth ranges has breached the selected one of the depth level thresholds; and
   f) causing a depth of the liquid within the reservoir to change.

18. The method according to claim 17, wherein step f) includes operating a pump.

19. The method according to claim 17 further comprising:

g) producing a visual reading that is indicative of the determined fraction of the selected depth range.

20. A fluid level sensing and control system comprising:

a housing, wherein the housing includes a cavity and at least one opening to the cavity;

a diaphragm in sealing engagement with the opening;

a biasing member in operative connection with the diaphragm, wherein portions of the diaphragm are operative to move inwardly and outwardly with respect to the cavity responsive to the opposed pressures of the biasing member and a fluid disposed outside the cavity;

a transducer in operative connection with the diaphragm, wherein the transducer is operative to produce an electrical signal representative of a current depth level of the fluid responsive to the displacement of the diaphragm with respect to the cavity;

at least one switch;

a controller device in operative connection with the transducer and the switch, wherein the controller device includes at least one input device that is operative to receive an input by an operator of at least one depth level threshold, wherein the at least one input device is further operative to receive an input by an operator of a desired depth level for the fluid, wherein the controller device is operative to determine a fractional relationship between the received desired depth level for the fluid and the current depth level of the fluid responsive to the electrical signals and the received desired depth level for the fluid, wherein the controller device is operative to control the at least one switch responsive to the determined fractional relationship breaching the received at least one depth level threshold.

21. The system according to claim 20, further comprising a reservoir and a pump in operative connection with the reservoir, wherein the reservoir includes the fluid therein, wherein the pump is operative to cause the current depth level of the fluid within the reservoir to change, wherein the switch is operative to control the operation of the pump responsive to the controller device.

22. The system according to claim 20, wherein the received at least one depth level threshold corresponds to a fraction.

23. The system according to claim 20, wherein the received at least one depth level threshold corresponds to a percentage.

24. A method comprising:

a) receiving an input representative of a desired depth level for a fluid in a reservoir;

b) receiving an input representative of at least one depth level threshold;

c) generating electrical signals responsive to a pressure responsive device disposed in the fluid;

d) determining a fractional relationship between the received desired depth level of the fluid and a current depth level of the fluid in the reservoir responsive to the electrical signals and the received desired depth level for the fluid; and e) determining whether the determined fractional relationship has breached the received at least one depth level threshold.

25. The method according to claim 24, wherein when the fractional relationship is determined to breach the at least one depth level threshold, further comprising:

f) causing a depth of the fluid within the reservoir to change.

26. The method according to claim 24, wherein when the fractional relationship is determined to breach the at least one depth level threshold, further comprising:

f) outputting an alarm signal.

27. The method according to claim 24, wherein in step (b) the at least one depth level threshold corresponds to a fraction.

28. The method according to claim 24, wherein in step (b) the at least one depth level threshold corresponds to a percentage.

* * * * *